US006827272B2

(12) United States Patent
Kolstad (10) Patent No.: US 6,827,272 B2
(45) Date of Patent: Dec. 7, 2004

(54) APPARATUS AND METHOD FOR AUTOMATIC GAIN CONTROL DURING SCANNING

(75) Inventor: Jesse J. Kolstad, Fife, WA (US)

(73) Assignee: Microscan Systems Inc., Renton, WA (US)

(*) Notice: Subject to any disclaimer, the term of this patent is extended or adjusted under 35 U.S.C. 154(b) by 0 days.

(21) Appl. No.: 10/251,213

(22) Filed: Sep. 20, 2002

(65) Prior Publication Data

US 2004/0169083 A1 Sep. 2, 2004

(51) Int. Cl.[7] ................................................ G06K 7/10
(52) U.S. Cl. .................. 235/470; 235/262.26; 369/124
(58) Field of Search .................................. 235/470, 462, 235/462.26; 369/124

(56) References Cited

U.S. PATENT DOCUMENTS

| 4,528,444 A | * | 7/1985 | Hara et al. ............. 235/462.26 |
| 4,792,666 A | * | 12/1988 | Cherry et al. .......... 235/462.26 |
| 5,168,148 A | * | 12/1992 | Giebel ................... 235/462.26 |
| 5,257,624 A | * | 11/1993 | Fraser et al. ................ 600/437 |
| 5,612,529 A | | 3/1997 | Coleman |
| 5,694,386 A | * | 12/1997 | Hirajima et al. .......... 369/47.25 |
| 5,701,003 A | | 12/1997 | Chisholm |
| 5,999,301 A | | 12/1999 | Chin et al. |
| 6,211,990 B1 | | 4/2001 | Chin et al. |

FOREIGN PATENT DOCUMENTS

WO    WO 01/26035    4/2001

* cited by examiner

Primary Examiner—Thien M. Le
Assistant Examiner—Daniel A. Hess
(74) Attorney, Agent, or Firm—Blakely Sokoloff Taylor & Zafman LLP (57) ABSTRACT

The disclosure describes an apparatus and method for automatic gain control during scanning. The apparatus comprises an optical detector to receive an optical signal reflected from a symbol positioned within a scan window by an optical beam scanned from a leading edge of the scan window to a trailing edge of the scan window; and a processor coupled to the optical detector to adjust the gain of the optical detector during the beam scan. The process comprises receiving an optical signal using an optical detector, wherein the optical signal comprises optical energy reflected from a symbol positioned in a scan window as an optical beam scans from a leading edge of the scan window to a trailing edge of the scan window, and adjusting the gain of the optical detector during receipt of the optical signal. A calibration process is disclosed comprising calibrating the optical detector to obtain a plurality of gain corrections, each gain correction corresponding to a different position between a leading edge and a trailing edge of a scan window, and storing the plurality of gain corrections.

21 Claims, 8 Drawing Sheets

| Scan No. | | Segment 5 | Segment 4 | Segment 3 | Segment 2 | Segment 1 |
|---|---|---|---|---|---|---|
| 1 | Peak Segment Amplitude:<br>Action → | <Baseline<br>Adjust $\Delta G_5$ | <Baseline<br>Adjust $\Delta G_4$ | <Baseline<br>Adjust $\Delta G_3$ | <Baseline<br>Adjust $\Delta G_2$ | <Baseline<br>Adjust $\Delta G_1$ |
| 2 | Peak Segment Amplitude:<br>Action → | <Baseline<br>Adjust $\Delta G_5$ | <Baseline<br>Adjust $\Delta G_4$ | <Baseline<br>Adjust $\Delta G_3$ | <Baseline<br>Adjust $\Delta G_2$ | <Baseline<br>Adjust $\Delta G_1$ |
| 3 | Peak Segment Amplitude:<br>Action → | <Baseline<br>Adjust $\Delta G_5$ | <Baseline<br>Adjust $\Delta G_4$ | <Baseline<br>Adjust $\Delta G_3$ | <Baseline<br>Adjust $\Delta G_2$ | <Baseline<br>Adjust $\Delta G_1$ |
| 4 | Peak Segment Amplitude:<br>Action → | ≥Baseline<br>Adjust $\Delta G_5$<br>Store $\Delta G_5$ | <Baseline<br>Adjust $\Delta G_4$ | <Baseline<br>Adjust $\Delta G_3$ | <Baseline<br>Adjust $\Delta G_2$ | <Baseline<br>Adjust $\Delta G_1$ |
| 5 | Peak Segment Amplitude:<br>Action → | | <Baseline<br>Adjust $\Delta G_4$ | <Baseline<br>Adjust $\Delta G_3$ | <Baseline<br>Adjust $\Delta G_2$ | <Baseline<br>Adjust $\Delta G_1$ |
| 6 | Peak Segment Amplitude:<br>Action → | | <Baseline<br>Adjust $\Delta G_4$<br>Store $\Delta G_4$ | <Baseline<br>Adjust $\Delta G_3$ | <Baseline<br>Adjust $\Delta G_2$ | <Baseline<br>Adjust $\Delta G_1$ |
| 7 | Peak Segment Amplitude:<br>Action → | | | <Baseline<br>Adjust $\Delta G_3$ | <Baseline<br>Adjust $\Delta G_2$ | <Baseline<br>Adjust $\Delta G_1$ |
| 8 | Peak Segment Amplitude:<br>Action → | | | ≥Baseline<br>Adjust $\Delta G_3$<br>Store $\Delta G_3$ | <Baseline<br>Adjust $\Delta G_2$ | <Baseline<br>Adjust $\Delta G_1$ |
| 9 | Peak Segment Amplitude:<br>Action → | | | | ≥Baseline<br>Adjust $\Delta G_2$<br>Store $\Delta G_2$ | <Baseline<br>Adjust $\Delta G_1$ |
| 10 | Peak Segment Amplitude:<br>Action → | | | | | ≥Baseline<br>Adjust $\Delta G_1$<br>Store $\Delta G_1$ |

*Figure 6*

APPARATUS AND METHOD FOR AUTOMATIC GAIN CONTROL DURING SCANNING

TECHNICAL FIELD

The present invention relates generally to scanners, and in particular, but not exclusively, to automatic gain adjustment during scanning.

BACKGROUND

Bar code scanners typically function by generating a thin beam of light and scanning the beam across a symbol to be read. The symbol typically comprises a plurality of alternating light (usually white) and dark (usually black) areas; the best-known symbols are bar codes, where the light and dark areas are formed by a white background with alternating black bars superimposed thereon. As the spot created by the projection of the beam onto the symbol travels across the symbol, it crosses the alternating light and dark areas and a portion of the light hitting the symbol is reflected back into the scanner. More light is reflected from the light areas than from the dark areas, so the optical energy reflected back into the scanner will consist of a signal containing a series of peaks corresponding to the light areas and valleys corresponding to the dark areas. Processing circuitry within the scanner then converts the received optical signal into an electrical signal and proceeds to decode the peaks and valleys in the signal, thus extracting the information contained in the symbol.

Figure 1A:
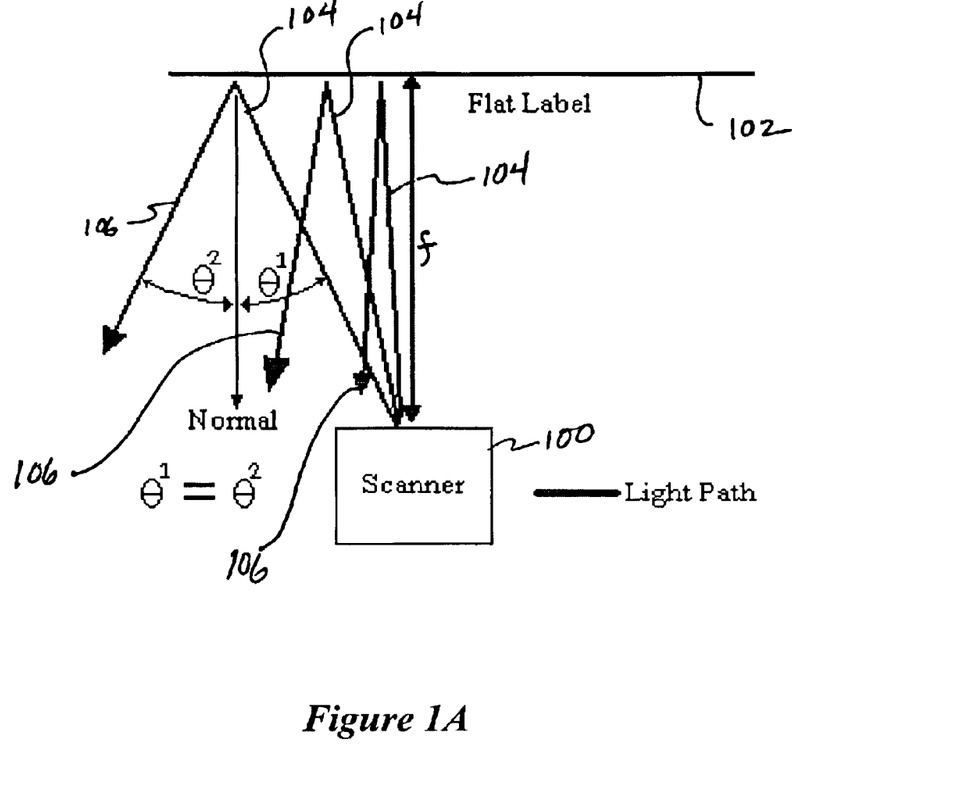
FIG. 1A is a plan view of a scanner reading a flat symbol.
Figure 1B:
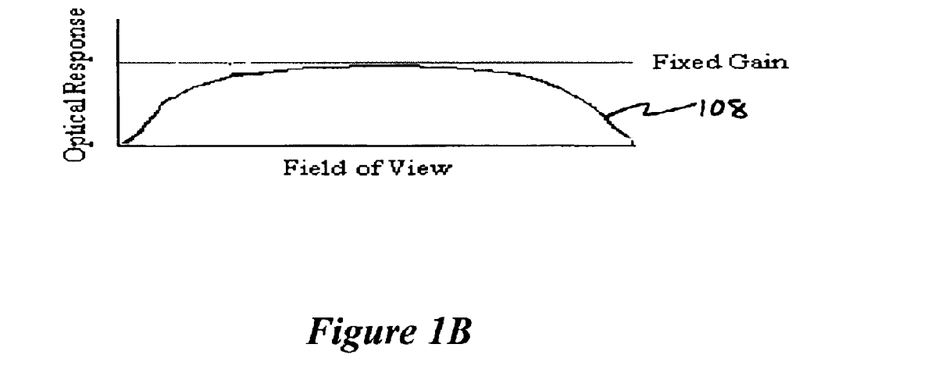
FIG. 1B is a graph showing the optical response of a scanner using constant gain.

FIGS. 1A and 1B illustrate a common problem that occurs when a scanner attempts to read a flat symbol. All scanners have a so-called "scan window" within which the symbol must be placed if the scanner is to correctly read it. In addition, scanners usually have a fixed focal length and depth of field, depending on the optics used in the scanner. Thus, not only must the symbol be within the scan window, but it also must be within a prescribed distance of the scanner to be read. FIG. 1A illustrates a typical scanner setup, with the scanner 100 positioned at the focal distance f from the label 102 containing a symbol to be read. When the scanning beam 104 is approximately in the central portion of the symbol 102, it is incident on the symbol at a perpendicular angle; in this case, a substantial amount of the optical energy of the beam is reflected back to the scanner and a small portion is absorbed by the symbol. As the beam scans and nears the edges of the scan window, it emerges from the scanner at an angle θ, meaning that the angle of incidence of the beam on the symbol is also θ; thus, $\theta_1 = \theta_2$ as shown. If the angle of incidence on the symbol is θ, then basic physics dictate that the angle of reflection from the symbol must also be θ. Thus, of the total optical energy contained in the incident beam, a certain portion is absorbed, a certain portion is reflected back toward the scanner, and a certain portion 106 is reflected into free space. As the angle θ increases, the proportion of the optical energy reflected back toward the scanner decreases, while the proportion 106 of the optical energy reflected into free space increases. As a result, the amount of optical power received at the scanner drops off significantly at the edges of the symbol, making it difficult to adequately scan, capture and decode the information contained near the edges of the symbol. The problem is particularly acute when the scanner must operate in very close quarters and must therefore be placed very close to the symbol. In this case, the focal distanced is substantially shorter than that shown in FIG. 1A, meaning that the angles θ are substantially larger, and that the return power at the edges of the symbol are substantially smaller. Thus, in scanners having a short focal length and operating near the symbol it is particularly challenging to properly read the edges of the symbol. FIG. 1B illustrates the effect of the above phenomenon on the optical response of the scanner.

Figure 1C:
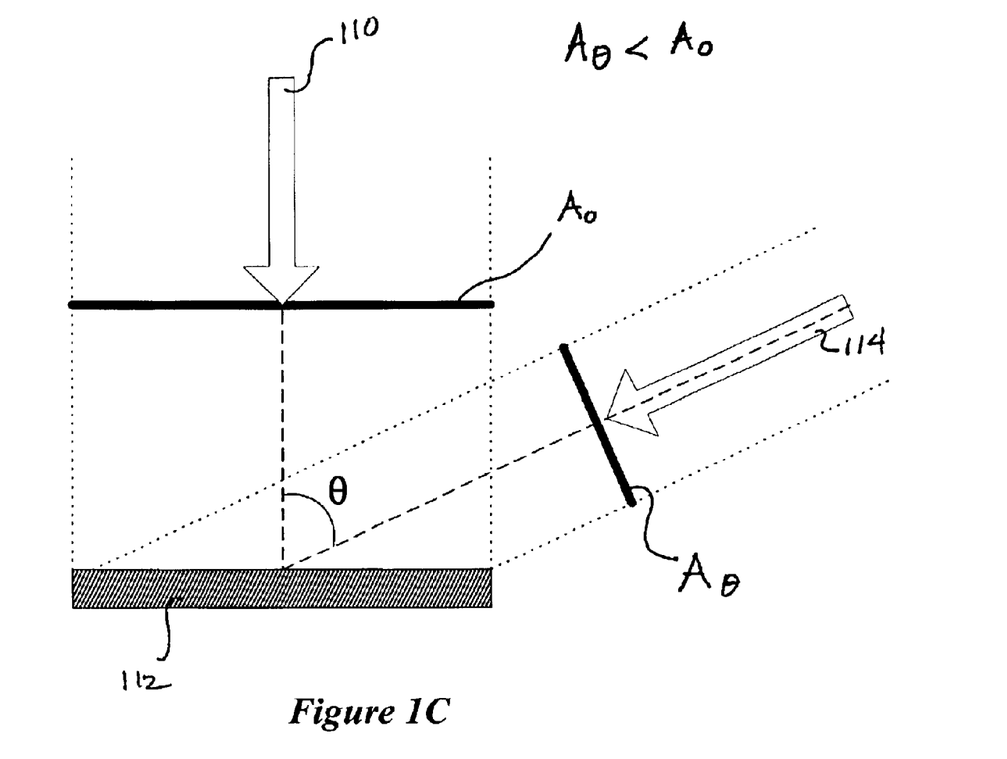
FIG. 1C is a diagram illustrating a phenomenon observed in the light-collection properties of optical detectors.

FIG. 1C illustrates another phenomenon that affects the optical response of the scanner. In addition to the fact that less optical energy is reflected from the symbol toward the scanner at higher angles θ, the optical response is also affected by the light-collection properties of the optical detector within the scanner. Specifically, the optical energy collected by an optical detector depends on the projected area of the detector in the direction from which the energy is collected. Thus, if a beam 110 is incident on a detector 112 at a normal angle (i.e., θ=0 degrees), then the detector 112 collects the optical energy over the entire area $A_0$. If instead a beam 114 is incident on the detector 112 at a non-zero angle θ, then the detector only collects energy over the projected area $A_\theta$, which is substantially smaller than the projected area $A_0$. As the angle θ increases, the area $A_\theta$ gets smaller, and thus the area over which the detector can collect optical energy decreases. This phenomenon factors into the optical response curve 108 shown in FIG. 1B.

Automatic Gain Control (AGC) is an approach used in the prior art to compensate for varying distances between the symbol and the scanner. With existing AGC systems the gain of the optical detector is changed from scan to scan, depending on the distance between the scanner and the symbol. Once a gain value is selected for a particular scan, it stays constant at that value throughout the particular scan. Thus, when the symbol is near to the scanner the gain can be adjusted downward, whereas when the symbol is farther from the scanner, the gain can be adjusted upward. The shortcoming of this approach is that although the gain can be varied from scan to scan, only a single gain value can be employed throughout any given scan. In other words, there is no way of adjusting the gain during a scan. This approach therefore cannot be used to address the problem of compensating for reduced optical response at the edges of a scanned symbol. In addition, even if a standard AGC could be adapted to compensate for gain changes during a scan, they would be much too slow.

One way of dealing with the poor optical response near the symbol edges is discussed in U.S. Pat. No. 5,701,003 to Chisholm et al ("Chisholm"). The approach taken in Chisholm to improve optical response of the scanner at the edges of the scan window is to increase the optical power of the laser in the scanner near the edges of the scan window while reducing the power of the laser near the middle of the scan window. Because the angles of incidence and reflection of the scanning beam continue to be the same at the edges of the scan window, the proportion of optical energy reflected back to the scanner at the edges of the scan window continues to be the same. Since the power of the incident beam is higher, however, the optical power reflected back to the scanner is higher. The net effect of the Chisholm approach is that the optical response curve is "flattened," so that the optical response is more nearly constant across the width of the scan window.

Despite the apparent elegance of the approach taken in Chisholm, it has several important disadvantages. First, increasing the power of the laser near the edges of the symbol has serious safety implications because the increased laser power can pose a danger to the eyes of the scanner operator or other bystanders, and when the beam nears the edge of the symbol more of the optical power is likely to be reflected into someone's eyes. Second, using the laser at a higher power output and continually cycling the laser between low and high power states will decrease the lifetime of the laser and the scanner, ultimately driving up costs to the end user. Finally, the higher power output of the laser means additional power consumption and additional heat dissipation problems. Power consumption and heat dissipation both can lead to additional expense in making and using the scanner, as well as inconvenience to the user who, in the case of a hand-held scanner, must carry the additional weigh of heat sinks, etc, used to dissipate the heat created by the additional power consumption of the laser.

Given the shortcomings in methods to improve scanning near the edges of the scan window, there is a need in the art for an improved method of improving the optical response of scanners.

SUMMARY OF THE INVENTION

The disclosure describes an apparatus and method for automatic gain control during scanning. The apparatus comprises an optical detector to receive an optical signal reflected from a symbol positioned within a scan window by an optical beam scanned from a leading edge of the scan window to a trailing edge of the scan window; and a processor coupled to the optical detector to adjust the gain of the optical detector during the beam scan. The process comprises receiving an optical signal using an optical detector, wherein the optical signal comprises optical energy reflected from a symbol positioned in a scan window as an optical beam scans from a leading edge of the scan window to a trailing edge of the scan window, and adjusting the gain of the optical detector during receipt of the optical signal. A calibration process is disclosed comprising calibrating the optical detector to obtain a plurality of gain corrections, each gain correction corresponding to a different position between a leading edge and a trailing edge of a scan window, and storing the plurality of gain corrections.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 6 is a table illustrating an embodiment of how the gain corrections are adjusted and stored during the calibration process of FIG. 5.

DETAILED DESCRIPTION OF THE ILLUSTRATED EMBODIMENTS

Embodiments of an apparatus and method for automatic gain control during scanning are described herein. In the following description, numerous specific details are described to provide an understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in this specification do not necessarily all refer to the same embodiment. Furthermore, the particular features, structures, or characteristics may be combined in any suitable manner in one or more embodiments.

Figure 2A:
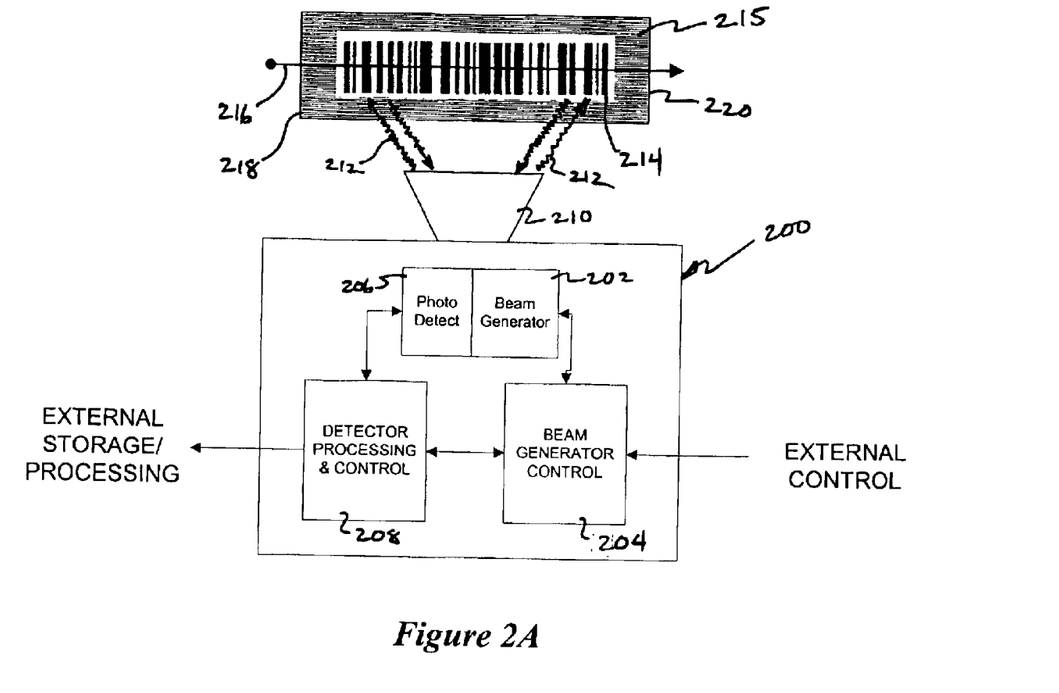
FIG. 2A is a simplified block diagram illustrating an embodiment of a scanner.
Figure 2B:
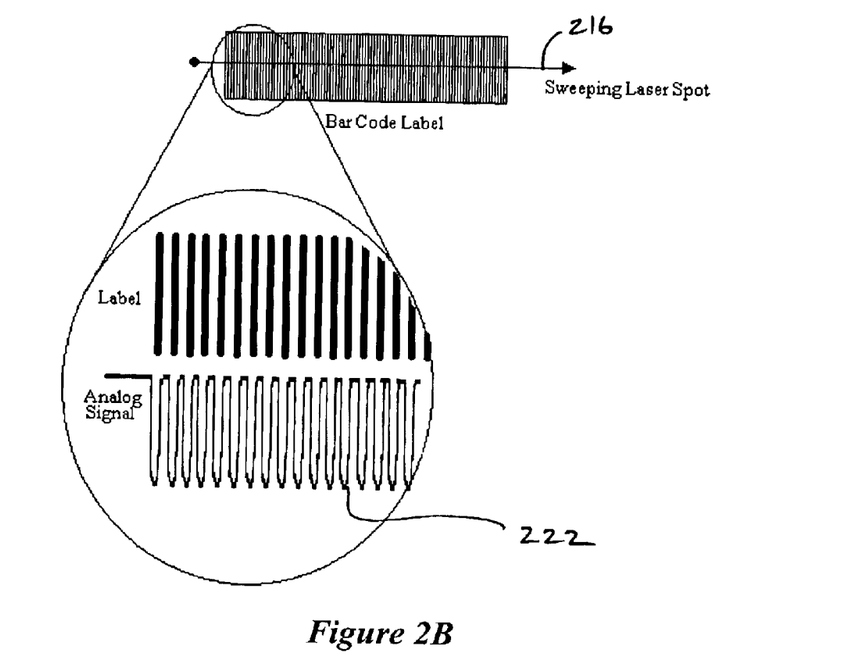
FIG. 2B is a diagram illustrating a typical analog optical signal carried in the optical energy reflected from a symbol.

FIGS. 2A–2B illustrate an embodiment of a bar code scanner 200 of the present invention. The bar code scanner 200 comprises a beam generator 202, a beam generator control module 204, an optical detector 206, a detector control and processing module 208, and a set of optics 210. Alternative embodiments of a scanner can have more, less, or different components, and the components can be grouped or arranged differently.

In operation, the beam generator 202, as controlled by the beam generator module 204, generates an optical beam 212—typically a laser beam in the visible range of wavelengths, but it can be other wavelength ranges as well—and scans the beam across a scan window 215. A bar code 214 is positioned within the scan window; the bar code 214 may occupy some or all of the width of the scan window 215. The scanning beam 212 creates a spot that traverses the scan window 215 and the bar code 214 along a scan path 216, from a leading edge 218 of the scan window to a trailing edge 220 of the scan window. As the beam scans across the scan window and reaches the bar code 214, a portion of the optical energy from the scanning beam is reflected from the bar code and travels back to the optics 210, where it is focused onto the optical detector 206. The magnitude of the optical energy reaching the optical detector 206 will vary according to whether the scanning beam is reflected from a light portion of the bar code or a dark portion of the bar code; thus, the reflected optical energy reaching the optical detector is an optical signal containing information from the bar code. As shown in FIG. 2B, the reflected optical energy reaches the optical detector 206, and the optical detector 206 converts the optical energy into an analog electrical signal 222, which is then routed to the detector processing and control module 208 for processing. The analog electrical signal generated by the optical detector 206 very closely approximates the optical signal received at the detector, and can be spoken of synonymously with the received optical signal. Thus, as used herein, the term "received signal" can refer to either the optical signal or the electrical signal, as the context may require.

Figure 3A:
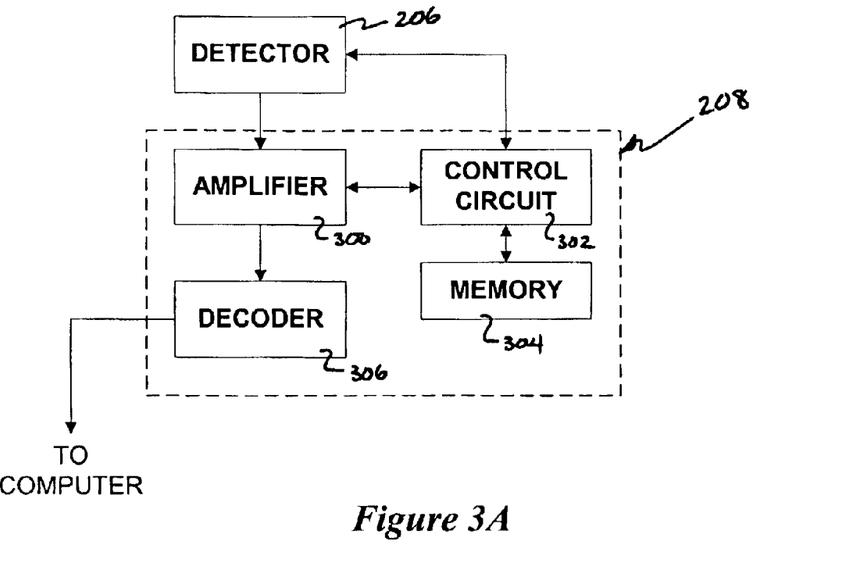
FIG. 3A is a block diagram of an embodiment of a processor for processing analog output of the optical detector of the scanner of FIG. 2A.

FIG. 3A illustrates an embodiment of the processing module 208 that can be coupled to the optical detector 206, although other or additional embodiments having more, less, or different components can also be used. FIG. 3A illustrates an analog processing circuit for processing the analog electrical signal produced by the optical detector in response to the optical signal received at the detector. When the optical detector 206 receives the optical signal reflected from the bar code 214, it converts the optical signal into a corresponding electrical signal, as shown in FIG. 2B. The electrical signal output from the optical detector 206 is routed to an amplifier 300, where the signal is amplified before processing. A control circuit 302 is coupled to the amplifier 300 to, among other things, monitor the amplitude of the signal and adjust the gain of the amplifier according to some defined criteria, further discussed below. In some cases, it may be possible to adjust the gain of the optical detector directly instead of adjusting the gain of the amplifier. The end result is the same no matter which gain is adjusted, so adjusting the gain of the optical detector and adjusting the gain of the amplifier can be considered synonymous.

The control circuit 302 can include a peak detector to monitor peak amplitudes of the electrical signal, and can also be connected to a memory 304 to retrieve gain control information or information for other purposes. Although shown as a separate module, the memory 304 may also be incorporated into the control circuit 302. After the signal has been amplified in the amplifier 300, it is routed to a decoder 306, which extracts the information contained in the amplified signal and thus decodes the bar code 214. Once the signal has been decoded and the information from the bar code extracted, the information may optionally be sent to some external component, such as a computer.

Figure 3B:
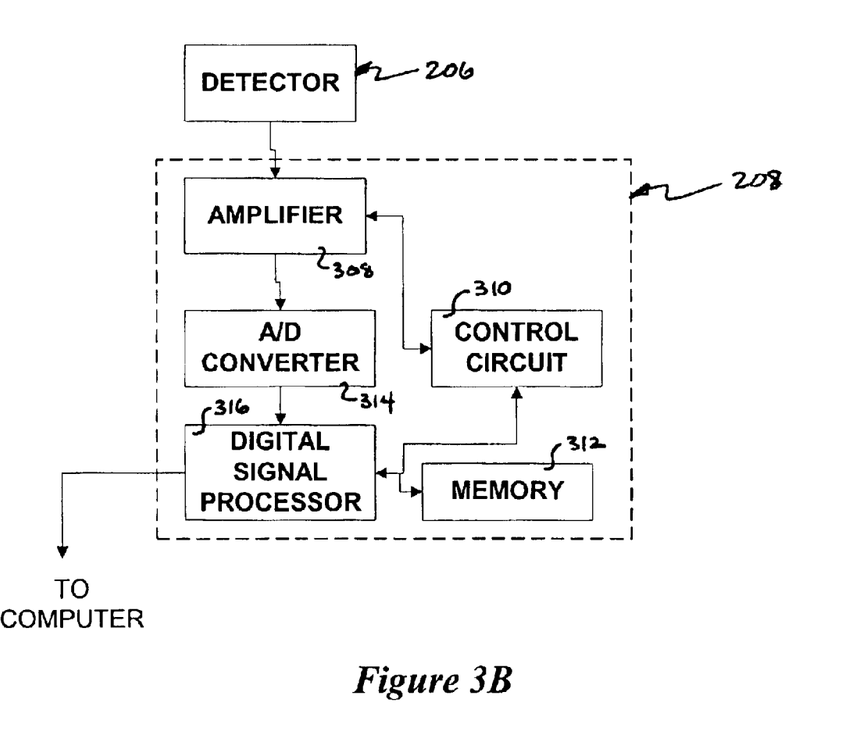
FIG. 3B is a block diagram of another embodiment of a processor for digitizing and processing digital output from the optical detector of the scanner of FIG. 2A.

FIG. 3B illustrates a digital processing circuit for processing the analog electrical signal produced by the optical detector in response to the optical signal received at the detector from the light reflected from the bar code. The electrical signal output from the optical detector 206 is routed to an amplifier 308, where the signal is amplified before processing. A control circuit 310 is coupled to the amplifier 308 to, among other things, monitor the amplitude of the signal and adjust the gain of the amplifier according to some defined criteria, further discussed below. The control circuit 310 can include a peak detector to monitor peak signal amplitudes, and the control circuit can also be connected to a memory 312, for example if it needs to retrieve gain control information or information for other purposes. Although shown as a separate module, the memory 312 may also be incorporated into the control circuit 310. After the signal has been amplified in the amplifier 308, it is routed to an analog/digital (A/D) converter 314, which digitizes the signal. The digitized signal is then transmitted to a digital signal processor (DSP) 316, where the information is extracted from the signal, thus decoding the bar code. The digital signal processor may also be coupled to the memory 312, and additionally may be coupled to the control circuit. That way, the DSP 316 can provide information to the control circuit 310 to allow it to determine whether to adjust the gain of the signal. Once the signal has been decoded and the information from the bar code extracted, the information may optionally be sent to some external component, such as a computer.

Figure 4A:
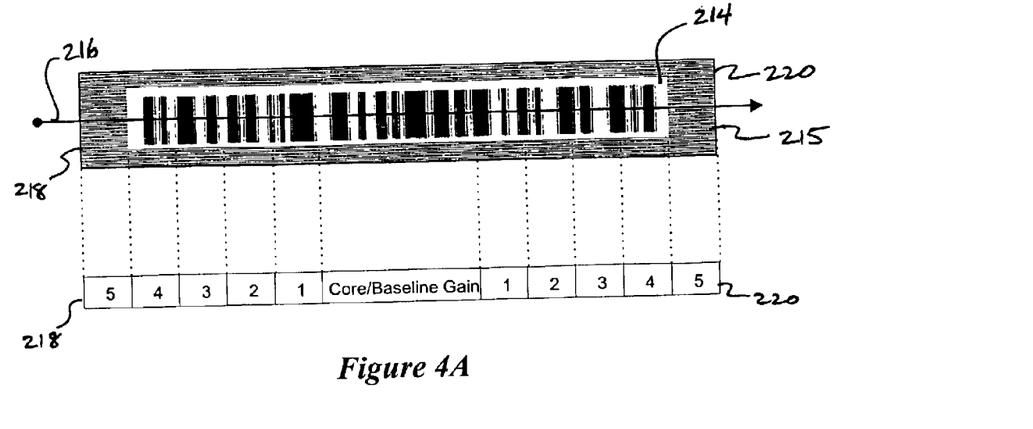
FIGS. 4A–4C are diagrams showing an embodiment of the invention for correcting the gain during a symbol scan.
Figure 4B:
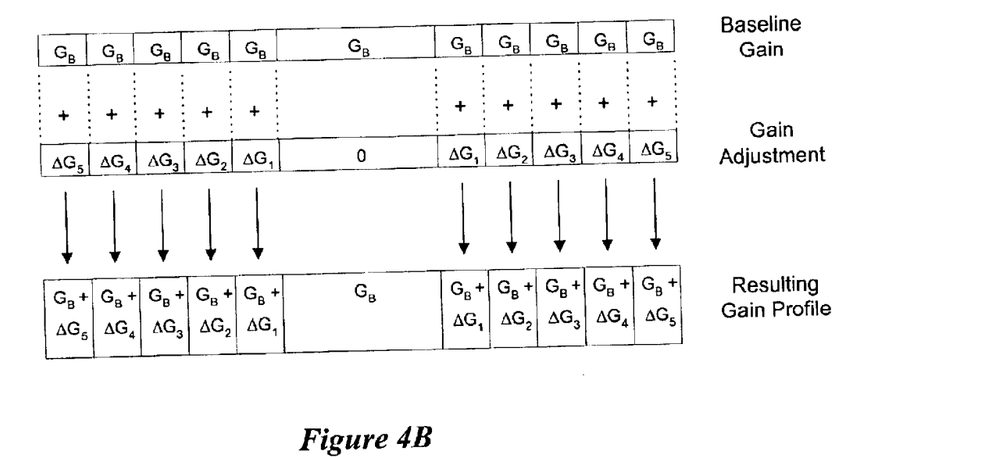
Figure 4C:
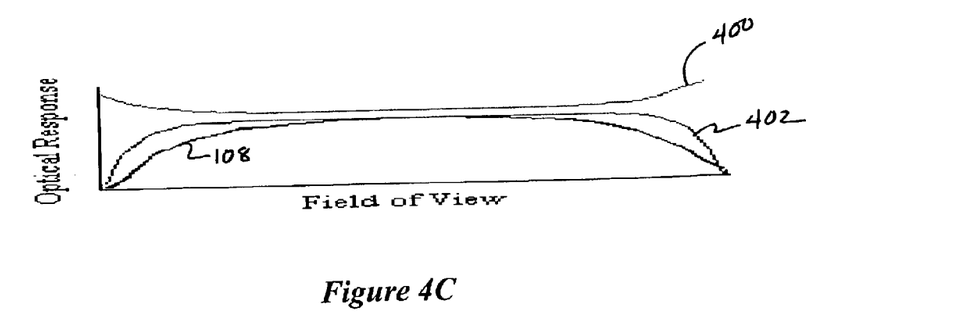

FIGS. 4A–4C illustrate an embodiment of the process by which the processing circuit 208 adjusts the gain profile of a particular scan to make the optical response more uniform during the scan. FIG. 4A illustrates a typical bar code 214 positioned within the scan window 215 of the scanner; the bar code 214 is one type of symbol that can be read using a scanner. As shown directly below the scan window, the scan window is divided into a plurality of different segments. The scan window is not itself physically divided into segments, but rather the internal representation of the scan window within the processing circuit is divided into segments as shown. Preferably, the minimum number of segments is eleven: 5 segments (numbered 1–5) bordering the leading edge 218 of the scan window, a single long "core" or baseline segment in the middle, and 5 segments numbered 1–5 bordering the trailing edge 220 of the scan window. Although 11 is the preferred number of segments, any number of segments can be used, with the understanding that a number of segments that is too small can result in inadequate resolution of the bar code and an inaccurate result, while a number of segments too large can result in additional or excessive processing time for each scan. Whatever the number of segments used, they can be distributed along the length of the scan window as shown or in some other manner. For example, the segments can be positioned using an exponential or logarithmic spacing scheme that would compress the numbered segments closer to the leading and trailing edges, and thus lengthen the baseline segment.

FIG. 4B illustrates the process by which the processing circuit adjusts the gain. In operation, the gain for a particular scan is set to some baseline value $G_B$. The value of $G_B$ can be determined, for example, using an automatic gain control (AGC) system that makes gain adjustments from scan to scan, depending for example, on the distance between the scanner and the symbol; generally, the value of $G_B$ will be relatively lower if the symbol 214 is close to the scanner, and will be relatively higher if the symbol 214 is farther from the scanner. As the scanning beam traverses the segments of the scan window, a gain correction $\Delta G$, is added to the baseline gain for each segment, such that $$G_i = G_B + \Delta G_i \text{ for } i=1 \text{ to } 5.$$

Although shown as additive gain adjustments $\Delta G_i$, in other embodiments the gain adjustments can be multiplicative—for example, the gain corrections can be formulated so that they are factors that multiply the baseline gain, instead of being added to the baseline gain. There usually will be no correction to the baseline gain in the core segment, since the gain in that segment is already at the desired value. Generally, but not always, in the segments numbered 1–5 where gain correction is needed the values of the gain corrections $\Delta G_i$ will be relatively higher nearer the leading edge 218 and the trailing edge 220 of the scan window, and will decrease monotonically and be relatively lower adjacent to the core or baseline segment. Thus, in general $$\Delta G_{i+1} > \Delta G_i \text{ for } i=1 \text{ to } 4.$$

As shown, the gain corrections $\Delta G_i$ will generally be symmetrical about the core or baseline segment, such that $\Delta G_5$ near the leading edge 218 of the scan window will be approximately equal to $\Delta G_5$ near the trailing edge 220. But this need not always be the case; it is entirely possible that the gain corrections may be asymmetrical.

FIG. 4C illustrates the results of applying the gain corrections as described above. Whereas previously the gain profile across the scan window would have been a flat line (i.e., the gain would have been constant $G_B$ across the window), the gain profile is now roughly a flat, U-shaped curve 400, with the gain being relatively higher near the leading and trailing edges and relatively lower near the middle of the scan window where less or no gain correction is necessary. With a flat gain profile, the optical response of the scanner is illustrated by the optical response curve 108 (see FIG. 1B), whereas with the corrected gain profile the optical response is as shown in curve 402. As can be seen, the optical response of the system using the corrected gain profile is substantially improved near the edges of the scan. The net effect of applying the gain corrections is to widen the effective scan window of the scanner.

Figure 5A:
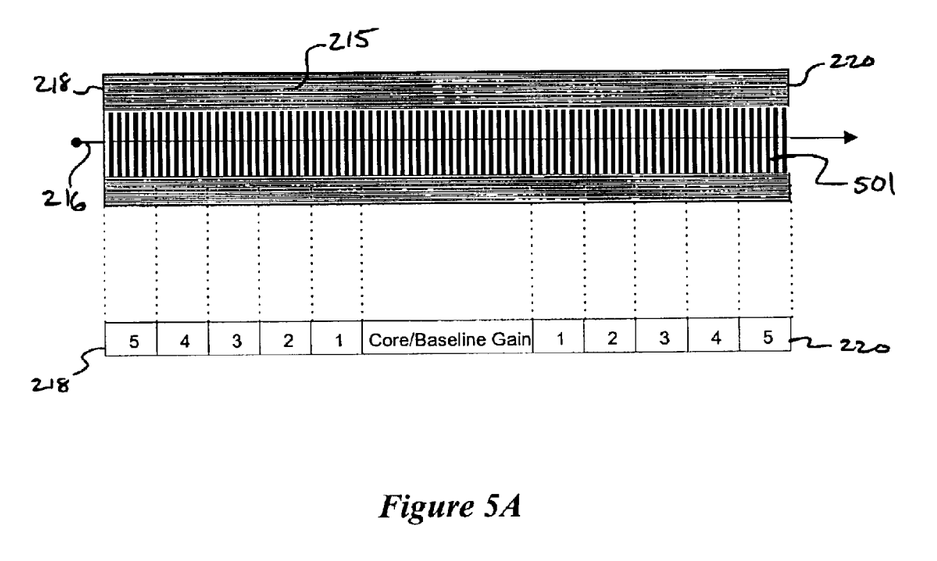
FIG. 5A is a diagram illustrating an embodiment of the segmentation of the scan window for calibration.
Figure 5B:
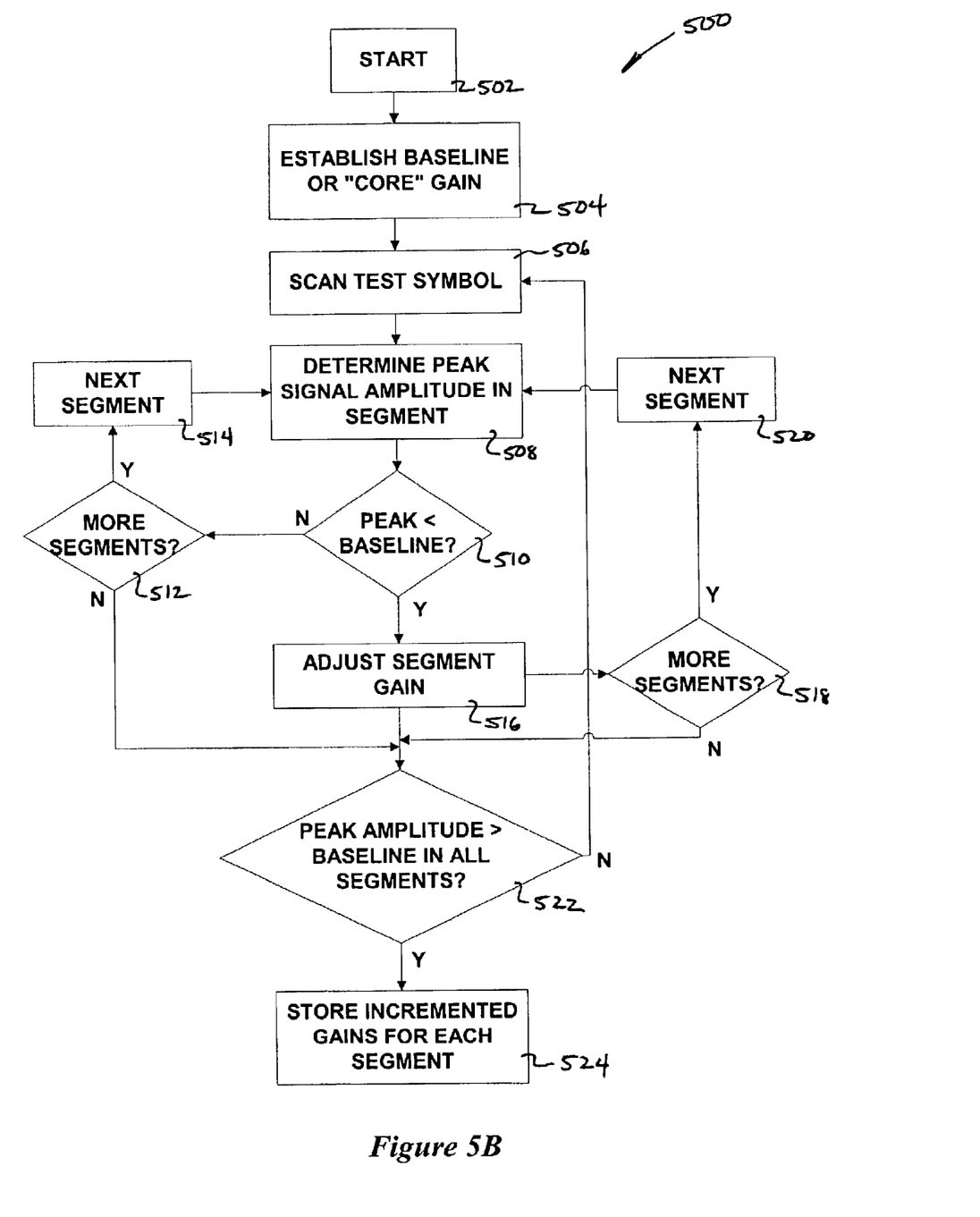
FIG. 5B is a flowchart illustrating an embodiment of a process for calibrating the scanner to obtain gain corrections.

FIGS. 5A and 5B illustrate an embodiment of a calibration process used to obtain the gain corrections $\Delta G_i$, which are then used to correct the gain in each segment as shown in FIG. 4B. FIG. 5A illustrates an embodiment of the calibration setup. As an initial matter, the scan window is divided into a plurality of segments as shown in connection with FIG. 4A. The number of segments used in calibration will correspond to the number of segments to be used during scanning. As before, the preferred number of segments is 11, although any number of segments can be used, with the understanding that a small number of segments can result in inadequate resolution of the bar code and an inaccurate result, while a large number of segments can result in additional or excessive processing time for each symbol. To begin the calibration, a test symbol 501 is positioned within the scan window 215. The test symbol 501 should be at least as wide as the scan window 215, and should be positioned to cover the entire width of the window 215 so that corrections can be obtained over the entire window width. The test symbol will generally be a bar code with evenly spaced bars of equal width, but may be some other symbol as well. The illustrated calibration is preferably performed only once in the factory, so that end users of the scanner need not re-calibrate the scanner at all.

FIG. 5B illustrates an embodiment of the actual calibration process 500. The calibration begins at block 502. At block 504, a baseline gain $G_B$ is established. The value of $G_B$ can be determined, for instance, using an automatic gain control (AGC) system. Most AGCs are designed to adjust the gain between scans and establish a single gain value for each scan, usually based on the distance between the scanner and the symbol being scanned; generally, the value of $G_B$ will be lower if the test symbol is close to the scanner, and will be relatively higher if the test symbol is farther from the scanner. Other methods of establishing $G_B$ may also be used; for example, $G_B$ can be determined by an initial scan of the test symbol itself, or may be chosen arbitrarily based on observation or experience by an operator.

At block 506 the test symbol is scanned, and at block 508 the peak amplitude of the signal in the first segment is determined using a peak detector of the kind known in the art. At block 510, the peak signal amplitude in the segment is compared to the peak signal amplitude in the baseline or core area. If the segment peak is greater than or equal to the baseline peak, then the process proceeds to block 512, where it checks to see if any segments remain; if any segments do remain, then the process moves to the next remaining segment at block 514, returns to block 508 and repeats the steps for each remaining segment.

If instead at block 510 the segment peak is lower than the baseline peak, then a gain correction $\Delta G_i$ for that segment is adjusted upward. The amount by which the values of $\Delta G_i$ are adjusted depends on the system being used. In one embodiment, the increment by which $\Delta G_i$ are adjusted can be a specific fraction of the overall gain range of the system. For example, in an 8-bit system one increment is 1/256 of total gain range. This increment could be adjusted by a factor of two or three, but for accuracy it is desirable to increment in the smallest steps possible. Although shown as additive gain adjustments $\Delta G_i$, in other embodiments the gain adjustments can be multiplicative—that is, the correction factor can be formulated so that it is multiplied by the gain instead of being added to the gain.

At block 516, the incremented $\Delta G_1$ is added to the baseline gain $G_B$ for segment i. At block 518, the process checks whether any segments remain; if segments remain, then at block 520 the process moves to the next segment and then returns to block 508 and performs the same process on the next segment. The loop continues until gain corrections have been computed for all segments. If at block 512 or block 518 the process determines that all segments have been processed, then at block 522 the system checks to see whether the peak amplitude in every segment was equal to or greater than the peak amplitude in the baseline segment; if not, then the process returns to block 506 and repeats the process for all segments. If at block 522 the process finds that the peak amplitude in every segment was equal to or greater than the peak amplitude in the baseline segment, then at block 524 the cumulatively adjusted gain corrections $\Delta G_i$ are stored for future use in scanning.

FIG. 6 illustrates an embodiment of how the gain corrections $\Delta G_i$ are incremented during the calibration process of FIG. 5. The table shows the adjustments for only 5 of the segments, which may be either the leading edge segments or the trailing edge segments. In either case, the process is identical for the remaining segments. In the example shown, during the first scan of the test symbol, all the peak amplitudes are less than the peak amplitude in the baseline segment, so the value of $\Delta G_1$ is incremented in each segment. During the second and third scans, the same procedure is repeated. When the fourth scan is reached, the value of $\Delta G_5$ has been adjusted upward enough that when the gain in segment 5 is adjusted upward by $\Delta G_5$, the peak amplitude in segment 5 is now greater than or equal to the peak amplitude in the baseline segment. That being the case, $\Delta G_5$ is finalized and stored; after the fourth scan, the value of $\Delta G_5$ is no longer incremented. The process described above repeats itself until $\Delta G_i$ for every remaining segment i has been incremented until the peak amplitude in that segment is greater than or equal to the peak amplitude in the baseline segment when the gain is corrected using the cumulatively adjusted $\Delta G_i$. When that occurs, the cumulatively incremented $\Delta G_i$ for all segments i are stored for future use in scanning, as described above in connection with FIGS. 4A through 4C.

The above description of illustrated embodiments of the invention, including what is described in the Abstract, is not intended to be exhaustive or to limit the invention to the precise forms disclosed. While specific embodiments of the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. A process comprising:
   scanning an optical beam across a scan window from a leading edge of the scan window to a trailing edge of the scan window;

receiving an optical signal using an optical detector, wherein the optical signal comprises optical energy reflected from a symbol positioned in the scan window as the optical beam scans across the scan window;

determining a baseline gain profile to be applied to the optical detector during the scan; and applying a gain correction profile to the baseline gain profile during receipt of the optical signal.

2. The process of claim 1 wherein the baseline gain profile is constant across the scan.

3. The process of claim 1 wherein the baseline gain profile is determined using an automatic gain control (AGC).

4. The process of claim 1 wherein applying a gain correction profile comprises applying a plurality or gain corrections, each gain correction corresponding to a different position between the leading edge and the trailing edge of the scan window.

5. The process of claim 1 wherein applying a gain correction profile comprises:

dividing the scan window into a plurality of segments;

applying a plurality of gain corrections to the optical detector, each gain correction corresponding to one of the segments.

6. The process of claim 5 wherein the plurality of segments comprises a plurality of segments grouped near the leading and trailing edges and a segment approximately midway between the leading and trailing edges.

7. The process of claim 5 wherein applying a gain correction profile involves recalling a plurality of stored gain corrections and applying each stored gain correction to its corresponding segment.

8. The process of claim 1, further comprising:

calibrating the optical detector to obtain the gain correction profile, the profile comprising a plurality of gain corrections, each corresponding to a segment of the scan window between the leading edge and the trailing edge; and storing the plurality of gain corrections.

9. The process of claim 8 wherein calibrating the optical detector comprises:

dividing the scan window into a plurality of segments;

scanning a test symbol and determining the peak amplitude of the received signal in each segment; and for each segment, calculating a gain correction based on the difference between the peak amplitude of the received signal in the segment and the maximum peak amplitude of the received signal throughout the scan.

10. The process of claim 9 wherein calculating a gain correction comprises adjusting the gain in each segment until the peak amplitude in the segment equals or exceeds the maximum peak amplitude, the gain correction being approximately equal to the cumulative gain adjustment in each segment.

11. A process for obtaining gain corrections for a scanner, the process comprising:

calibrating the optical detector to obtain a plurality of gain corrections, each gain correction corresponding to a different position between a leading edge and a trailing edge of a scan window; and storing the plurality of gain corrections.

12. The process of claim 11 wherein calibrating the optical detector comprises:

dividing a scan window into a plurality of segments;

scanning a test symbol and determining the peak amplitude of the received signal in each segment; and for each segment, calculating a gain correction based on the difference between the peak amplitude of the received signal in the segment and the maximum peak amplitude of the received signal throughout the scan.

13. The process of claim 12 wherein calculating a gain correction comprises adjusting the gain in each segment until the peak amplitude in the segment equals or exceeds the maximum peak amplitude, the gain correction being approximately equal to the cumulative gain adjustment in each segment.

14. The process of claim 13 wherein calibrating the optical detector and storing the gain corrections is done once.

15. An apparatus comprising:

an optical detector to receive an optical signal reflected from a symbol positioned within a scan window by an optical beam scanned from a leading edge of the scan window to a trailing edge of the scan window;

a processor coupled to the optical detector to adjust the gain of the optical detector during the beam scan; and a memory, wherein the optical detector is calibrated to obtain a plurality of gain corrections, each gain correction corresponding to a segment of the scan window between the leading edge and the trailing edge, and the plurality of gain corrections are stored in the memory, wherein calibrating the optical detector comprises:

dividing the scan window into a plurality of segments, scanning a test symbol positioned in the scan window and determining the peak amplitude of the received signal in each segment, and for each segment, calculating a gain correction based on the difference between the peak amplitude of the received signal in the segment and the maximum peak amplitude of the received signal throughout the scan.

16. A scanning apparatus comprising:

an optical beam generator to generate an optical beam and scan the optical beam across a scan window from a leading edge of the scan window to a trailing edge of the scan window;

an optical detector to receive an optical signal reflected front a symbol positioned in the scan window;

a processor coupled to the optical detector to adjust the gain of the optical detector during the scan; and a memory coupled to the processor, the memory having a plurality of gain corrections stored therein, wherein the optical detector is calibrated to obtain a plurality of gain corrections, each gain correction corresponding to a segment of the scan window between the leading edge and the trailing edge, and the plurality of gain corrections are stored in the memory, and wherein calibrating the optical detector comprises:

dividing the scan window into a plurality of segments;

scanning a test symbol and determining the peak amplitude of the received signal in each segment; and for each segment, calculating a gain correction based on the difference between the peak amplitude of the received signal in the segment and the maximum peak amplitude of the received signal throughout the scan.

17. The apparatus of claim 16 wherein calculating a gain correction comprises adjusting the gain in each segment until the peak amplitude in the segment equals or exceeds the maximum peak amplitude, the gain correction being approximately equal to the cumulative gain adjustment in each segment.

18. A process comprising:
   calibrating an optical detector to obtain a plurality of gain corrections, each gain correction corresponding to a segment of the scan window between the leading edge and the trailing edge, wherein calibrating the optical detector comprises:
      dividing the scan window into a plurality of segments,
      scanning a test symbol and determining the peak amplitude of the received signal in each segment, and
      for each segment, calculating a gain correction based on the difference between the peak amplitude of the received signal in the segment and the maximum peak amplitude of the received signal throughout the scan;
   storing the plurality of gain corrections;
   receiving an optical signal using the optical detector, wherein the optical signal comprises optical energy reflected from a symbol positioned in a scan window as an optical beam scans from a leading edge of the scan window to a trailing edge of the scan window; and
   adjusting the gain of the optical detector during receipt of the optical signal.

19. The process of claim 18 wherein calculating a gain correction comprises adjusting the gain in each segment until the peak amplitude in the segment equals or exceeds the maximum peak amplitude, the gain correction being approximately equal to the cumulative gain adjustment in each segment.

20. A process for obtaining a gain correction profile for a scanner including an optical detector, the process comprising:
   calibrating the optical detector to obtain the gain correction profile, the profile comprising a plurality of gain corrections, each gain correction corresponding to a different position between a leading edge and a trailing edge of a swan window, wherein calibrating the optical detector comprises:
      dividing the scan window into a plurality of segments,
      scanning a test symbol and determining the peak amplitude of the received signal in each segment, and
      for each segment, calculating a gain correction based on the difference between the peak amplitude of the received signal in the segment and the maximum peak amplitude of the received signal throughout the scan, and storing the gain correction profile.

21. The process of claim 20 wherein calculating a gain correction comprises adjusting the gain in each segment until the peak amplitude in the segment equals or exceeds the maximum peak amplitude, the gain correction being approximately equal to the cumulative gain adjustment in each segment.

* * * * *